United States Patent [19]

Beales et al.

[11] Patent Number: 4,539,033

[45] Date of Patent: Sep. 3, 1985

[54] METHOD FOR DRYING OXIDE GLASSES

[75] Inventors: Keith J. Beales, Sproughton; Steve F. Carter, Ipswich; Sally Partington, Billercay; Paul W. France, Woodbridge, all of England

[73] Assignee: British Telecommunications, London, England

[21] Appl. No.: 530,359

[22] Filed: Sep. 8, 1983

[30] Foreign Application Priority Data

Sep. 10, 1982 [GB] United Kingdom ............... 8225837

[51] Int. Cl.$^3$ .......................... C03B 5/00; C03B 5/225
[52] U.S. Cl. ......................................... 65/134; 65/3.13
[58] Field of Search ................ 65/3.13, 134, 136; 501/37, 43, 38, 44

[56] References Cited

U.S. PATENT DOCUMENTS

| 4,065,280 | 12/1977 | Kao et al. | 65/3.13 |
| 4,385,128 | 5/1983 | Boudot et al. | 65/134 X |

FOREIGN PATENT DOCUMENTS

| 0018109 | 10/1980 | European Pat. Off. |  |
| 0041398 | 12/1981 | European Pat. Off. |  |
| 0081928 | 6/1983 | European Pat. Off. |  |
| 55-144437 | 11/1980 | Japan | 65/3.12 |
| 56-149332 | 11/1981 | Japan |  |
| 1507712 | 4/1978 | United Kingdom |  |
| 2033373 | 5/1980 | United Kingdom |  |
| 2038311 | 7/1980 | United Kingdom | 65/3.12 |
| 2084988 | 4/1982 | United Kingdom |  |

OTHER PUBLICATIONS

Tsukamoto et al; Conference: IOOC 1981, Third International Conference on Integrated Optics and Optical Fiber Communications; S.F., CA, USA; Apr. 27-29, 1981; M14 Phosphate Glass Fiber Made by Liquid Phase Process.

Shibata et al; Applied Optics, vol. 19, No. 9, May 1, 1980, pp. 1484-1488.

Beales et al; Proceedings of the IEE, vol. 123, No. 6, pp. 591-596, 6/1976; IEE, Savoy Place, London WC2R OBL, England.

Primary Examiner—Kenneth M. Schor
Attorney, Agent, or Firm—Cushman, Darby & Cushman

[57] ABSTRACT

An oxide glass is dried by passing through a melt of the glass fluorine or another perhalogenated compound including fluorine atoms. For example, $C_3F_8$ (e.g. after pre-cracking) can be used to reduce the OH content of a borosilicate glass, and the loss of an optical fibre drawn from such a glass, to low levels.

11 Claims, No Drawings

METHOD FOR DRYING OXIDE GLASSES

This invention relates to a method for drying oxide glasses, e.g. of the type for use in optical fibres, by passing a dry gas through a melt of the glass. The purpose of the drying step is to reduce the water content to the extent that, when the glass is used in an optical fibre, the fibre loss is minimised. The silica glass absorption minimum (c. 1.4 μm) is close to an OH absorption peak at this wavelength, and the OH content should therefore be minimised.

Various methods for making optical fibre glasses are known. In one process, doped silica is deposited inside a tube, e.g. from silicon tetrachloride in oxygen, which is then sintered to produce silica glass which is heated further and collapsed, at about 1700°–1900° C., to form a rod preform. The preform is then drawn into fibres. Chlorine is generated in the initial stages of the process, and chlorine gas is passed subsequently, in order to effect drying. EP-A-No. 0041398 discloses another method for preparing oxide glass fibres, in which a porous preform is prepared by collecting powdered reaction products on a mandrel, and is then heated and sintered. Chlorine gas is used to dry the glass, during heating. This procedure, and the procedure described above, can be used to prepare glasses having a low water content, e.g. less than 1 ppm OH, suitable for high grade optical fibres with low loss.

GB-A No. 2084988 discloses introducing a gaseous material into the tube during its collapse, in order to remove a layer of previously deposited material which would otherwise be incorrectly doped owing to evaporation at the temperature required to cause collapse. This etching effect on soft silica, associated with the presence of fluorine in the gas can be accompanied by drying associated with chlorine vapour if the gas is a fluorochlorocarbon. Exemplified gaseous materials include $CCl_2F_2$, $CFCl_3$, $CF_3Cl$, $CF_4$, $F_2$ and $SF_6$. Many of these are "Freon" compounds which are also known for their stability under ambient conditions, and their utility as propellants and as atmospheres for, for example, growing crystals.

A relatively inexpensive procedure for preparing optical fibres comprises melting core and cladding glasses in the inner and outer annuli of a two-part circular crucible, and drawing together and solidifying the molten glasses. The core glass at least is usually dried prior to drawing, e.g. by passing a drying gas through a melt of the glass. Conventional procedures, using oxygen and $CO_2$ sequentially, the latter optionally in admixture with CO, in a sealed system, have provided OH contents of the order of 5–10 ppm. This is approximately equivalent to a fibre loss of 10 dB/km at 0.96μ (a 1:1 correlation in the given units is often observed). This process is particularly suitable for the preparation of "multimode" fibres having high numerical aperture values.

The "double-crucible" technique for the preparation of optical fibres is described in, for example, GB-A No. 1507712. That document discloses a mixture of CO and $CO_2$ as the sole drying gases for alkali metal borosilicate glasses. A similar technique is described in GB-A No. 2033373, where it is preferred that dry oxygen is passed through the melt in the crucible from which the fibre is drawn.

JP-A No. 56-149332 describes drying borosilicate glasses by passing a gaseous chloride through the molten glass. The preferred chlorides are $SiCl_4$, $GeCl_4$, $BCl_3$, $POCl_3$ and $PCl_3$. The use of a gaseous mixture of 10% $SiCl_4$ and 90% dry oxygen, at 1350° C., is claimed to give a glass having a water content of about 4 ppm. In a comparative experiment using chlorine rather than $SiCl_4$, the water content of the product is reported as 30 ppm. A primary assumption of this disclosure is that the non-halogen element of the chloride forms a glass component in the melt.

It would be desirable to reduce the water content of an oxide glass melt to a degree even lower than has previously been achieved, thereby making the last of the preparative procedures described above suitable for making high quality optical fibres with core glasses having low loss, e.g. below 20 dB/km (at 850 nm), and also for cladding glasses.

According to the present invention, a method for drying an oxide glass comprises passing through the molten glass a drying gas which is a perhalogenated compound in which the halogen atoms include fluorine.

The nature of the glass is not critical. It may be any suitable oxide glass, of a type used or proposed for use in optical fibres. The glass may be an aluminosilicate or, preferably, a borosilicate glass. Examples of suitable glasses are the core glasses disclosed in EP-A No. 0018109 and EP-A No. 0081928 (see, in particular, the Examples on page 9).

Use of the present invention can dry a glass melt without substantially changing the absorption characteristics of the glass. The passage of non-covalent halogen compounds such as metal fluorides through the melt is not a preferred feature of the invention, but many such compounds are anyway inoperable, on account of their high boiling point. The method of the invention is intended to allow a particular, desired glass having a predetermined composition to be dried effectively without introducing contaminants, i.e. elements which effectively change the properties for which the glass is intended. This means, for fibre optics, the glass absorption change, at, say, 850 nm, should not exceed ±1% and most preferably ±0.5%.

The drying gas may be $F_2$ or a compound which contains only halogen-non-halogen and, if the non-halogen is carbon, carbon-carbon bonds. The non-halogen element in such a compound may be, for example, S or, preferably, C. The halogen atoms in such a compound are preferably selected only from fluorine and chlorine. It is preferred that fluorine should comprise at least half the halogen atoms, and most preferred that fluorine should be the only halogen. Particular perhalogenated compounds suitable for use in the invention are $F_2$, $SF_6$ and the halocarbon compounds generally known as Freons, including $CCl_3F$, $CCl_2F_2$, $CF_4$, $(CClF_2)_2$, $C_2F_6$, $C_3F_8$, $C_4F_{10}$ and perfluorocyclobutane. Freon compounds are well known and are generally suitable for use in the invention, at least those having up to 4 or 5 carbon atoms.

An advantage of using Freon compounds is their stability and ease of handling at ambient conditions. For the same reason, fluorine gas may be less preferred than others suitable for use in the invention. Chlorine is ineffective. Without wishing to be bound to any theory, it seems desirable that the drying compound should in fact have a degree of instability at the temperature of use, e.g. 900° to 2000° C., but more usually 1000° to 1500° C., in order that it generates a drying species, in situ. This species may be, for example, F. or $F_2$. Exceptionally stable compounds such as $CF_4$ may therefore work less well than higher Freons, and it is often preferred that a Freon of 2 or 3 carbon atoms should be used. $C_3F_8$ is most preferred.

The method of the invention may be conducted in a manner similar to previous drying treatments, e.g. that described in GB-A No. 1507712. In its simplest embodiment, therefore, a sealed, lined container is provided containing the glass melt, inlets for the introduction of an inert atmosphere, above the melt, and for drying gas, into the melt, and a gas outlet.

As has been stated above, known drying gases have been used to reduce the OH content of oxide glass melts to 10 ppm or, for the same drying time and for a lower melt volume, lower levels. In order to reduce to a minimum the time of use of the gaseous compound, without affecting its utility, and in view of the potential corrosive effect of that compound on the glass, it is therefore preferred to adopt a drying schedule in which a known gas is first used, and a perhalogenated compound subsequently. This can be simply controlled by using, for example, conventional flow meters.

A typical drying schedule may comprise the passage of a conventional drying gas for about 2 hours, followed by a perhalogenated compound for a similar time. A perhalogenated compound may be bubbled through the melt together with $CO/CO_2$ (but preferably not with $O_2$). After drying, the melt may be heated to remove bubbles, i.e. fined. The conventional drying gas may itself be pre-dried with a perhalogenated compound as defined herein.

We have found that it is often desirable to heat (precrack) the perhalogenated compound, in order to minimise the impurity level in the glass. This is certainly the case for perhalocarbons, and particularly for Freons having 2 or more carbon atoms, where the omission of a pre-cracking stage can cause the deposition of carbon in the glass. Pre-cracking, say, a perhalocarbon may cause some break-down of the original compound. A pre-heating stage can also advantageously be used for non-carbonaceous drying compounds such as fluorine, in order to remove impurities (which may be deposited as, for example, $CuF_2$). Pre-cracking, e.g. of $C_3F_8$, can be conducted in conventional manner, e.g. at 500° to 1000°, preferably 700° to 900° C., in a decarboniser. Pre-cracking apparatus can be introduced into the drying gas flow line during operation of the novel process.

The following Examples illustrate the invention.

EXAMPLES 1 to 6

Sealed apparatus was used, having two gas inlets and a gas outlet. One of the gas inlets led into the bottom of the apparatus, which was surrounded by a platinum liner.

In operation, a glass melt was in a silica crucible in the platinum liner and a drying gas was bubbled through the melt. $CO_2$ was passed through the other gas inlet and provided an atmosphere of this "fining" gas above the melt. In all cases, the $CO_2$ was passed at a rate of 2 l/min.

The drying gas comprised, in sequence, $CO_2$, $O_2$, $CO/CO_2$ and $C_3F_8$. In Examples 2 to 6, the $C_3F_8$ was pre-cracked in a decarboniser, in which free carbon was produced and condensed out.

A sodium borosilicate glass was used in each Example, intended for the core of an optical fibre. Its bulk OH level was evaluated by measuring the height of the fundamental OH absorption peak at 2.8μ on an infrared spectrometer; a peak height of 0.01 cm$^{-1}$ was considered equivalent to a water content of 1 ppm in the glass. This gives a good indication of relative, if not absolute, values. This and fibre loss results are given in the following Table. Fibres were made by the last of the various methods described above.

| Example | Melt Size (g) | $C_3F_8$ Precrack (°C.) | $C_3F_8$ Flow Rate (ml/min) | Bulk OH (ppm) | Fibre Loss (dB/km) at 850 nm |
|---|---|---|---|---|---|
| 1 | 400 | None | 20 | 1.0 | 12 |
| 2 | 800 | 400 | 17.5 | 1.3 | 9.2 |
| 3 | 800 | 800 | 10 | 1.2 | 6.4 |
| 4 | 800 | 900 | 5 | 1.5 | 6.5 |
| 5 | 800 | 800 | 5 | 2.5 | 6.8 |
| 6 | 800 | 800 | 5 | 2.3 | 7.6 |

EXAMPLE 7

A sodium calcium borosilicate core glass composition (I) and a compatible sodium borosilicate cladding glass composition (II) were dried, using a pre-heating stage and apparatus similar to that used in the preceding Examples, and were then pulled into a glass fibre by the "double crucible" technique.

In drying, a mixture of $CO/CO_2$ (18% CO v/v) and $C_3F_8$ was bubbled through the melt at 500 and 17.5 cm$^3$min. for 1.5 hours at 1220° C. 2 l/min. $CO_2$ and 2 cm$^3$/min. $C_3F_8$ were used as the fining gas for 18 hours at 1250° C. The bulk glass OH contents were 2.5 ppm (I) and 1.8 ppm (II). By comparison, when $C_3F_8$ was omitted, the respective values were 8 and 6 ppm.

The resultant fibres were analysed for loss by the cut-back method. The $C_3F_8$-dried fibre had a loss of 7.4 dB/km at 1300 nm, a similar value at 920 nm, and only 2.9 dB/km at 1200 nm. The fibre whose glasses had been conventionally dried had loss values, at the same wavelengths, of 16–17, 17–18 and 7–8 dB/km, respectively.

We claim:

1. A method for drying an oxide glass, and thereby reducing the water content of the glass, which comprises providing glass in a molten state, and passing a drying gas through the glass while it is in the molten state, in which the drying gas is of a perhalogenated compound containing only halogen and non-halogen atoms, where the non-halogen atoms are either carbon or sulphur, and at least some of the halogen atoms in the perhalogenated compound are fluorine.

2. A method according to claim 1, in which a perhalogenated compound including fluorine atoms is heated, prior to introduction into the molten glass, to reduce the amount of components in the gas which may be retained in the glass.

3. A method according to claim 1, in which the halogen atoms are selected only from fluorine and chlorine.

4. A method according to claim 3, in which the compound is perfluorinated.

5. A method according to claim 2, in which the compound is a perhalocarbon.

6. A method according to claim 5, in which the compound is a perfluorocarbon.

7. A method according to claim 6, in which the perfluorocarbon is $C_3F_8$.

8. A method according to claim 1, in which a gas selected from CO and $CO_2$ is passed through the molten glass at the same time as, or prior to, the said perhalogenated compound.

9. A method according to claim 1, in which O₂ is passed through the molten glass prior to the said perhalogenated compound.

10. A method according to claim 1, in which the glass is a borosilicate for use in optical fibres.

11. A process for drying borosillicate glass, and thereby reducing the water content of the glass, which comprises providing glass in a molten state, and passing a drying gas through the glass while it is in the molten state, in which the drying gas is as of a perfluorinated compound selected from SF₆ and fluorocarbons having only carbon and fluorine atoms and having 1 to 5 atoms.

* * * * *